United States Patent [19]
Kobayashi

[11] Patent Number: 5,037,355
[45] Date of Patent: Aug. 6, 1991

[54] BICYCLE FRONT DERAILLEUR
[75] Inventor: Jun Kobayashi, Osaka, Japan
[73] Assignee: Maeda Industries, Ltd., Osaka, Japan
[21] Appl. No.: 587,992
[22] Filed: Sep. 25, 1990
[30] Foreign Application Priority Data Sep. 28, 1989 [JP] Japan .............................. 1-114686[U]

[51] Int. Cl.⁵ .............................................. F16H 9/06
[52] U.S. Cl. ....................................................... 474/82
[58] Field of Search ..................................... 474/77–82

[56] References Cited
U.S. PATENT DOCUMENTS

| | | | |
|---|---|---|---|
| 4,530,678 | 7/1985 | Wechsler | 474/82 X |
| 4,604,078 | 8/1986 | Nagano | 474/82 X |
| 4,675,995 | 6/1987 | Iwasaki | 474/80 |

Primary Examiner—Thuy M. Bui
Attorney, Agent, or Firm—William H. Eilberg

[57] ABSTRACT

The present invention provides a bicycle front derailleur mounted close above a multiple chainwheel for shifting the chain from one sprocket to another of the chainwheel. The derailleur comprises a parallelogrammic linkage mechanism deformably mounted to a seat tube of the bicycle frame, and a chain guide carried by the linkage mechanism. The linkage mechanism is always biased by a return spring in a direction to move the chain guide laterally away from the seat tube. The linkage mechanism includes an inner link and an outer link. The outer link has an upper end formed with an actuating arm extending laterally toward the seat tube for connection to a control cable which is used to pull up the actuating arm for deforming the linkage mechanism against the return spring.

6 Claims, 3 Drawing Sheets

BICYCLE FRONT DERAILLEUR

BACKGROUND OF THE INVENTION

1. Field of the Invention

The present invention relates to a bicycle front derailleur for shifting a chain from one sprocket to another of a multiple chainwheel to thereby perform an intended speed change.

2. Description of the Prior Art

In general, a front derailleur associated with a multiple chainwheel (front gear) is mounted on a bicycle usually in combination with a rear derailleur associated with a multiple freewheel (rear gear), so that the rider can select a greater number of speeds than possible with the rear derailleur alone. When the chain engages a larger sprocket of the chainwheel and/or a smaller sprocket of the freewheel, a larger gear ratio will result to enable higher speed running. Conversely, when the chain engages a smaller sprocket of the chainwheel and/or a larger sprocket of the freewheel, the gear ratio will become smaller to cause the bicycle to run at a lower speed with a higher torque.

The bicycle front derailleur includes a chain guide which has inner and outer guide plates respectively located on both sides of the chain extending between the front and rear gears. The front derailleur is operated to translate the chain guide laterally of the bicycle, namely axially of the front gear, thereby pressing the chain at a position thereof advancing into engagement with the front gear. Most commonly used for moving the chain guide in this way is a parallelogrammic linkage mechanism, as disclosed for example in FIG. 6 of U.S. Pat. No. 4,674,995. When the rider manipulates a shift lever on the bicycle frame, a control cable connected to the shift lever is pulled to deform the linkage mechanism, thereby translating the chain guide laterally of the bicycle. This causes the inner or outer guide plate of the chain guide to push the chain laterally, whereby the chain in engagement with one sprocket of the chainwheel is shifted to another sprocket of the chainwheel to change the bicycle running speed.

The parallelogrammic linkage mechanism usually incorporates a return spring which functions to deform the linkage mechanism in a returning direction. When the rider pivots the shift lever to pull the control cable, the linkage mechanism is deformed against the return spring. On the other hand, when the rider pivots the shift lever to pay out the cable, the linkage mechanism is deformed in the returning direction by the elastic force of the return spring. In this way, the reciprocal pivotal movement of the shift lever causes the chain guide to translate reciprocally relative to the front gear, thereby enabling the speed change.

The multiple chainwheel (front gear), which is mounted to a pedal crank assembly, consists of diametrically different sprockets which include a largest sprocket (top gear) located laterally farthest from the bicycle frame, and a smallest sprocket (low gear) located laterally closest to the frame. Bicycle front derailleurs incorporating a parallelogrammic linkage mechanism are classified into two types, namely "top normal type" and "low normal type", depending on the direction in which the return spring of the linkage mechanism functions to return the chain guide.

With a front derailleur of the top normal type, the parallelogrammic linkage mechanism is deformed by the urging force of the return spring to return the chain guide to a position corresponding to the largest sprocket (top gear) when the control cable is maximally paid out. Conversely, with a front derailleur of the low normal type, the parallelogrammic linkage mechanism is deformed by the biasing force of the return spring to return the chain guide to a position corresponding to the smallest sprocket (low gear) when the control cable is maximally paid out.

The front derailleur disclosed in U.S. Pat. No. 4,674,995 above belongs to the low normal type. The present invention, on the other hand, concerns bicycle front derailleurs of the top normal type.

Before describing the present invention, reference is now made to FIG. 3 which shows a conventional bicycle front derailleur of the top normal type.

As shown in FIG. 3, the conventional front derailleur comprises a parallelogrammic linkage mechanism generally represented by reference numeral 10. The linkage mechanism comprises four members, i.e., a base member 2 fixed to the seat tube 1 of the bicycle frame as by a clamp band, an inner link 3 pivoted at its one end (upper end) 3a to the base member 2 by a pin 5, an outer link 4 pivoted at its one end (upper end) 4a to the base member by another pin 6, and a movable member 9 pivoted to the respective other ends (lower ends) of the inner and outer links by further pins 7, 8.

The four pins 5, 6, 7, 8 pivotally connecting the four members 2, 3, 4, 9 together are located at the four corners of a parallelogram. Thus, when the linkage mechanism 10 deforms, the movable member 9 translates laterally toward and away from the bicycle frame.

The movable member 9 is integrally formed with a chain guide 11 which includes an inner guide plate 11a and an outer guide plate 11b. Both guide plates are generally parallel to each other and spaced apart by a distance permitting a chain C to pass therebetween. The chain guide 11 is located above a chainwheel S close thereabove. For the purposes of simplicity, the chainwheel S is shown to have only two sprockets which include a smaller sprocket Sa and a larger sprocket Sb.

The linkage mechanism 10 is always biased by a return spring 15 so as to move the chain guide 11 laterally away from the bicycle frame, i.e., toward the larger sprocket Sb. The outer link 4 has an intermediate portion provided with a connector 14 for connection to one end of a control cable 13.

The control cable 13, which is connected at the other remote end to the shift lever (not shown), extends downward along the down tube (not shown) of the bicycle frame, and then upward generally along the seat tube 1. Further, the cable is directed laterally away from the seat tube 1 by a cable guide 12 fixed to the base member 2 before being connected to the connector 14.

The shift lever is reciprocally pivotable to wind up or pay out the cable 13. Thus, the cable may be moved lengthwise thereof to operate the front derailleur.

When the rider manipulates the shift lever to pull the cable 13 in the direction of arrow P in FIG. 3, the link mechanism 10 deforms against the elastic force of the spring 15 to translate the chain guide 11 in the direction of arrow p. As a result, the outer guide plate 11b of the chain guide 11 presses the chain C engaging the larger sprocket Sb into shifted engagement with the smaller sprocket Sa.

Conversely, when the shift lever is reversely operated to pay out the cable 13 in the direction of arrow Q, the linkage mechanism 10 restoratively deforms under the elastic force of the spring 15 while the degree of restoration is regulated by the amount of the cable payout. As a result, the chain guide 11 translates in the direction of arrow q, so that the chain C is pushed by the inner guide plate 11a again into engagement with the larger sprocket Sb.

As apparent from FIG. 3, the conventional front derailleur of the top normal type necessitates an arrangement in which the control cable 13 must pass at least two directional change points or bent points. Specifically, a first bent point is located at the frame bottom lug where the seat tube 1 is connected to the down tube (not shown), whereas a second bent point is positioned at the cable guide 12. In fact, such a cable arrangement gives rise to the following drawbacks.

First, since the control cable 13 is bent twice to a great degree at the bottom lug of the bicycle frame and the cable guide 12, the cable is subjected to a large frictional resistance which greatly impairs the operability of the shift lever. Further, the large frictional resistance causes damaging abrasion of the cable, consequently shortening the life of the cable.

Second, because of the two directional change points at the frame bottom lug and the cable guide 12, the cable 13 must extend over a large length from the shift lever to the front derailleur. Obviously, the longer the cable, the greater the elastic elongation thereof when subjected to an operational tension. Therefore, the response accuracy of the front derailleur lowers by that much at the time of operating the shift lever.

Third, since the cable extends round the bottom lug of the bicycle frame and along the down tube, the cable is readily subjected to deposition of mud scattered by the rotating front wheel. Obviously, such mud deposition causes deterioration of the cable due to corrosion or the like.

SUMMARY OF THE INVENTION

It is, therefore, an object of the present invention to provide a bicycle front derailleur of the top normal type which overcomes all of the foregoing problems of the conventional derailleur with a simple construction.

According to the present invention, there is provided bicycle front derailleur which is mounted to a seat tube of the bicycle frame at a position close above a multiple chainwheel, the chainwheel comprising diametrically different sprockets, the derailleur being operated to press a chain laterally of the bicycle at a portion of the chain moving into engagement with the chainwheel for shifting the chain from one sprocket to another of the chainwheel, the derailleur comprising: a base member fixed to the seat tube; an inner link having one end connected to the base member by a pin that the inner link is pivotable laterally of the bicycle; an outer link having one end connected to the base member by another pin so that the outer link is pivotable laterally of the bicycle; and a movable member to which the respective other ends of the inner and outer links are pivoted by further pins; wherein: the respective pins are arranged at the respective corners of a parallelogram so that the base member, the inner link, the outer link and the movable member together form a deformable parallelogrammic linkage mechanism which is always biased by a return spring in a direction to translate the movable member laterally away from the seat tube; the movable member carries a chain guide which includes an inner guide plate and an outer guide plate, the inner and outer guide plates being opposed to each other on both sides of the chain; and the outer link is provided at said one end thereof with an actuating arm extending laterally toward the seat tube, the actuating arm having a free end connected to a control cable for pulling up the actuating arm.

According to the arrangement described above, the parallelogrammic linkage mechanism can be deformed against the return spring by pulling up the actuating arm which extends laterally toward the bicycle frame from the outer link. Therefore, the control cable may extend along the seat tube from above for connection to the actuating arm without greatly bending the cable. Thus, the cable is less likely subjected to a large friction and mud deposition.

Further, when the shift lever is provided on the frame top tube which is connected to the seat tube, the overall length of the control cable may be rendered smaller than is possible when bending the cable at the bottom lug of the bicycle frame. Thus, the elastic elongation of the cable may be made minimum to improve the operational response of the front derailleur.

According to a preferred embodiment of the present invention, the free end of the actuating arm is located in near proximity of the seat tube.

Advantageously, the actuating arm extends slightly downwardly toward the seat tube when the linkage mechanism is deformably returned by the return spring to a normal position in which the chain guide is located maximally away from the seat tube. Such an arrangement ensures that a small pulling or paying-out movement of the control cable results in a maximum translation of the chain guide.

Other objects, features and advantages of the present invention will become apparent from the following detailed description given with reference to the accompanying drawings.

DESCRIPTION OF THE PREFERRED EMBODIMENT

Figure 1:
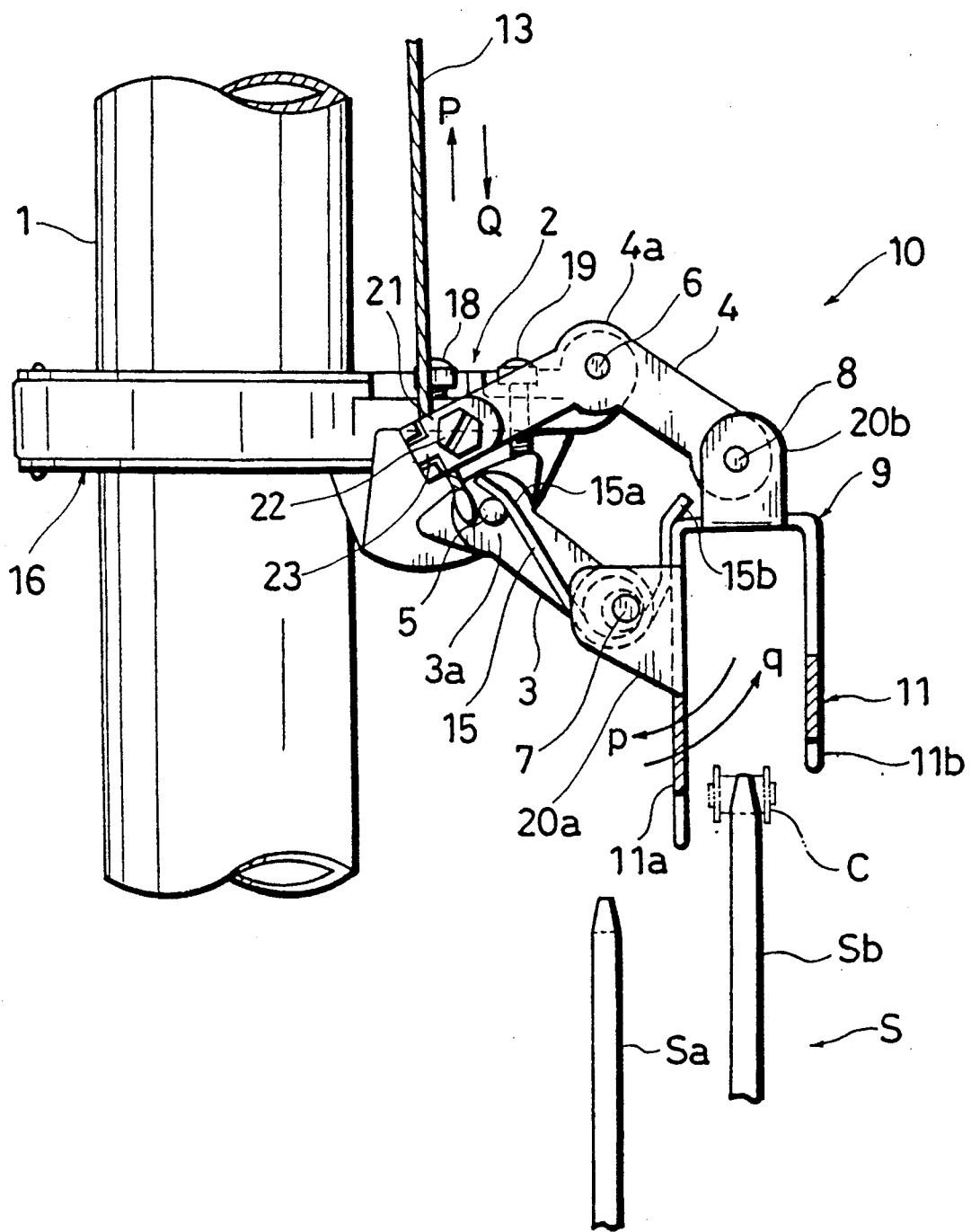
FIG. 1 is a rear view showing a bicycle front derailleur embodying the present invention in a condition wherein the control cable is maximally paid out to position the chain guide at a larger sprocket.
Figure 2:
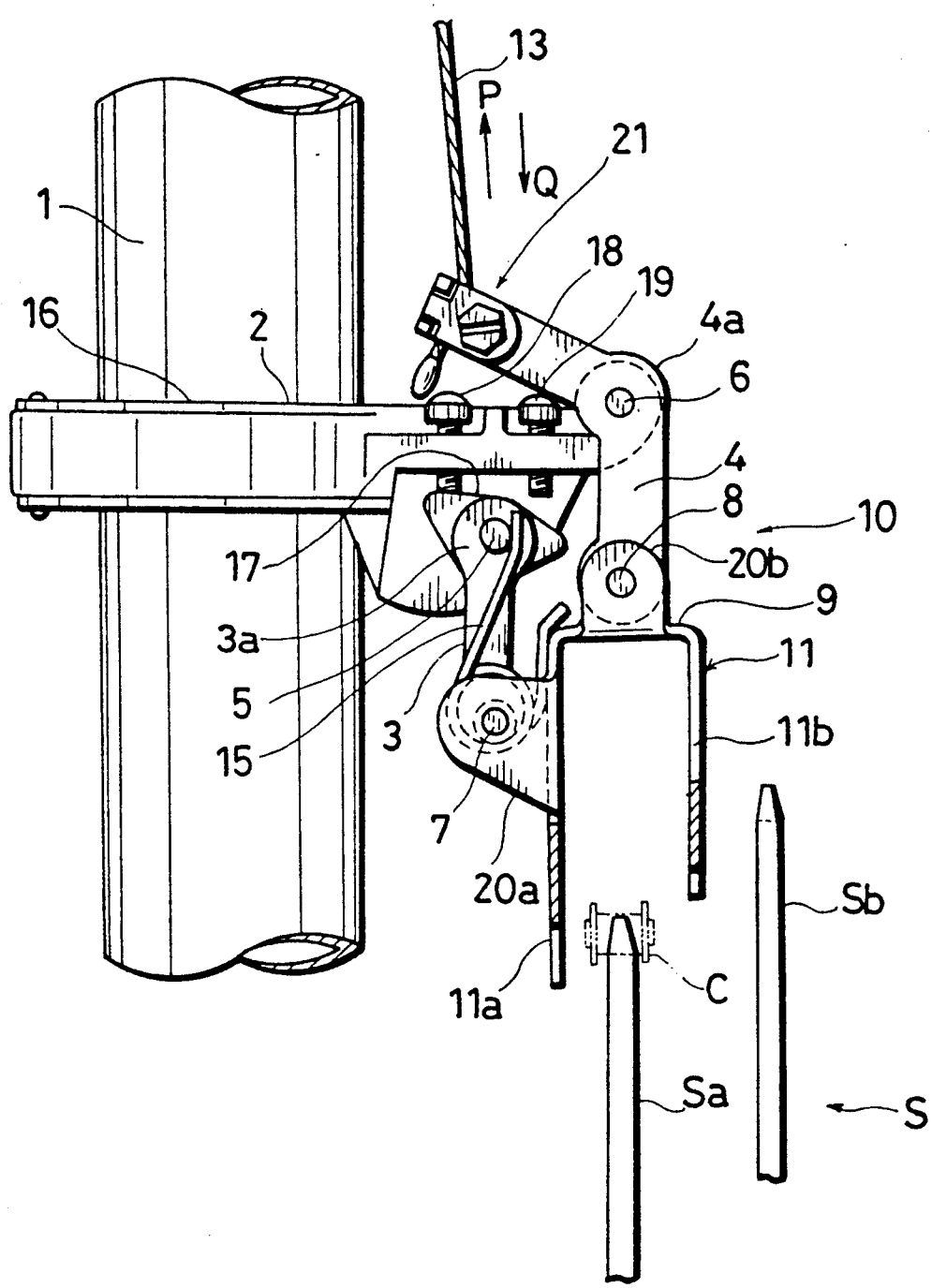
FIG. 2 is a rear view showing the same derailleur in another condition wherein the chain guide is located at a smaller sprocket.
Figure 3:
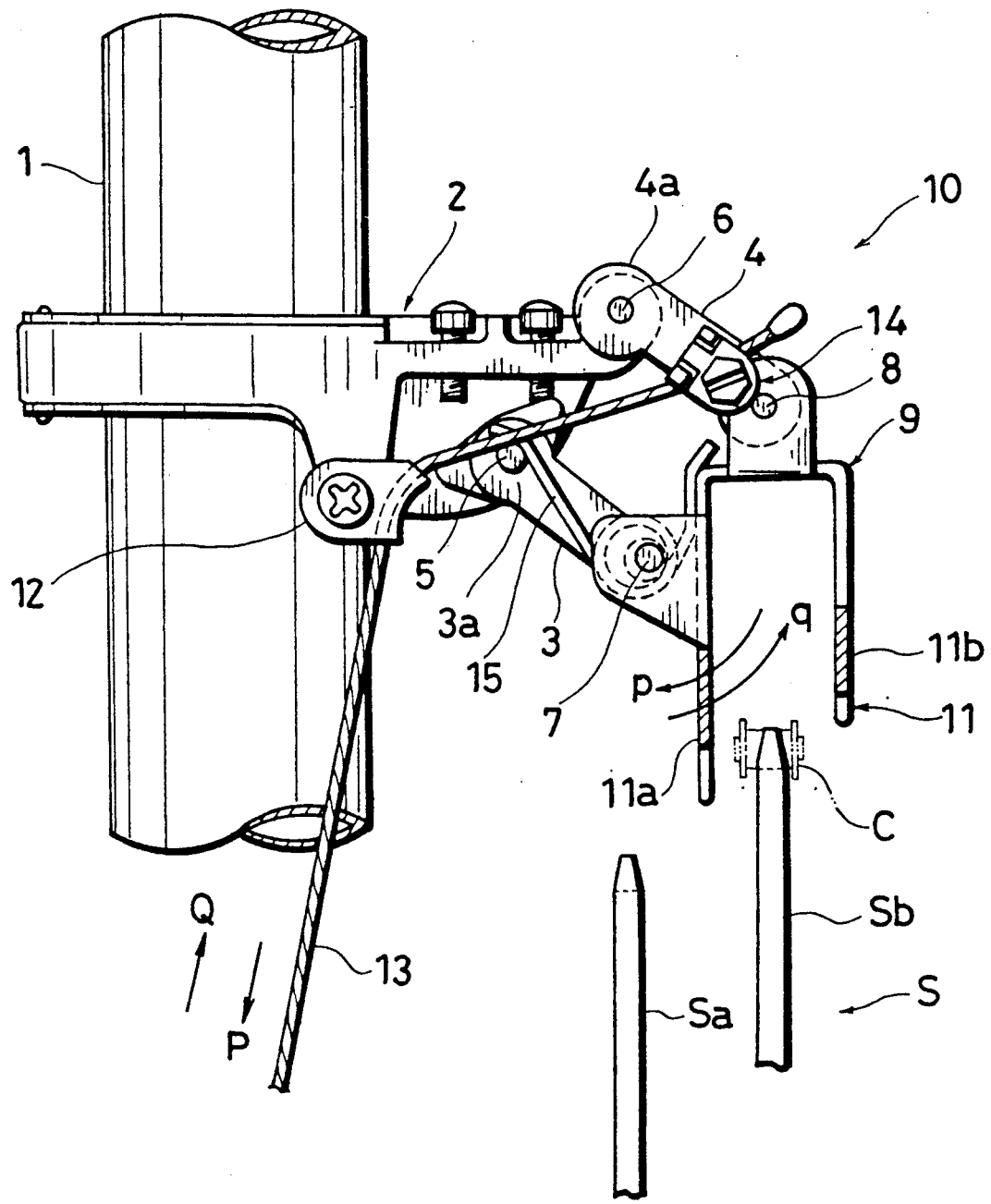
FIG. 3 is a view similar to FIG. 1 but showing a conventional front derailleur.

FIGS. 1 and 2 of the accompanying drawings show a bicycle front derailleur of the top normal type according to a preferred embodiment of the present invention. For the convenience of illustration, the parts of the preferred embodiment which are identical or similar to those of the conventional front derailleur are designated in FIGS. 1 and 2 by the same reference numerals as used in FIG. 3.

As shown in FIG. 1, the front derailleur is mounted to the seat tube 1 of the bicycle frame at a suitable level relative to a multiple chainwheel S which in turn is mounted to a pedal crank assembly (not shown). The illustrated chainwheel has only two diametrically different sprockets which include a smaller sprocket Sa and a larger sprocket Sb with the latter arranged laterally farther from the seat tube. The chainwheel may additionally include one or more sprockets.

The front derailleur comprises a parallelogrammic linkage mechanism 10 mounted to the seat tube 1, and a chain guide 11 carried by the linkage mechanism.

The linkage mechanism 10 comprises four members. These four members include a base member 2 fixed to the seat tube 1 of the bicycle frame by an annular clamp 16, an inner link 3 pivoted at its one end (upper end) 3a to the base member 2 by a pin 5, an outer link 4 pivoted at its one end (upper end) 4a to the base member by another pin 6, and a movable member 9 pivoted to the respective other ends (lower ends) of the inner and outer links by further pins 7, 8.

According to the illustrated embodiment, the movable member 9 is in the form of an inverted U-shaped member to work also as the chain guide 11 which has an inner guide plate 11a and an outer guide plate 11b. The inner guide plate and top wall of the chain guide (the movable member) are respectively provided with brackets 20a, 20b for pivotal connection to the respective links 3, 4. Both guide plates are generally parallel to each other and spaced apart by a distance enough for permitting a chain C to pass therebetween.

The four pins 5, 6, 7, 8 pivotally connecting the four members 2, 3, 4, 9 together are located at the four corners of a parallelogram. Thus, when the linkage mechanism 10 deforms, the chain guide 11 (the movable member 9) translates laterally toward and away from the bicycle frame.

According to the illustrated embodiment, the pin 6 at the upper end 4a of the outer link 4 is located above the pin 5 at the upper end 3a of the inner link 3. This positional arrangement is preferred because the larger sprocket Sb is located laterally farther from the bicycle frame than the smaller sprocket Sa, so that it is necessary to correspondingly raise the chain guide 11 as the linkage mechanism 10 is deformably pivoted away from the frame, as clearly appreciated by comparing FIGS. 1 and 2.

As better shown in FIG. 2, the upper end 3a of the inner link 3 is provided with a stopper 17 which selectively comes into stopping abutment with adjustable screws 18, 19 provided on the base member 2. Obviously, the screw 18 limits the pivotal deformation of the linkage mechanism 10 toward the bicycle frame (FIG. 2), whereas the other screw 19 restrains the pivotal deformation of the linkage mechanism away from the frame (FIG. 1). By adjusting the respective positions of these screws, it is possible to suitably alter the pivotal range of the linkage mechanism.

The linkage mechanism 10 is always biased by a return spring 15 so as to move the chain guide 11 laterally away from the bicycle frame, i.e., toward the larger sprocket Sb. According to the illustrated example, the return spring is in the form of a coil spring provided around the pin 7 at the lower end of the inner link 3. The coil spring has one leg 15a engaging the pin 5 at the upper end of the inner link from the side away from the seat tube. The coil spring further has another leg 15b engaging the inner guide plate 11a of the chain guide 11 from the side closer to the seat tube.

According to the present invention, the upper end 4a of the outer link 4 is integrally formed with an actuating arm 21 extending toward the seat tube 1. The actuating arm has a free end connected to one end of a control cable 13. For this purpose, the arm free end may be provided with a screw 22 and a clamp member 23, so that the cable end is interposed between the arm free end and the clamp member under pressure upon tightening up the screw 22.

Preferably, the actuating arm 21 should be as long as possible, provided that the free end of the actuating arm clears the seat tube 1 and the base member 2 to enable pivotal deformation of the linkage mechanism 10. In this way, the arm free end is located in near proximity of the seat tube 1 for most convenient connection to the control cable 13.

Further, advantageously, the actuating arm 21 should extend slightly downwardly toward the seat tube 1 when the linkage mechanism 10 assumes its normal top position shown in FIG. 1. This arrangement ensures that the actuating arm transiently traverses a horizontal position before assuming the other position shown in FIG. 2. As easily appreciated by those skilled in the art, the amount of vertical displacement of the pivotal actuating arm 21 is largest when the arm traverses a horizontal position. Therefore, even a slight pull of the control cable 13 causes a large deformation of the linkage mechanism 10, thereby increasing the operational response of the front derailleur.

The control cable 13, which is connected at the other remote end to the shift lever (not shown), extends downward along the seat tube 1 of the bicycle frame for direct connection to the actuating arm 21 without requiring any cable guide. The shift lever, which may be of any known type, is mounted for example on the top tube of the frame.

The operation of the front derailleur having the arrangement described above is now described starting from the top normal position wherein the chain guide 11 is located immediately above the larger sprocket Sb.

When the unillustrated shift lever is manipulated to pull the cable 13 in the direction of arrow P to pivot the actuating arm 21 about the pin 6 clockwise in FIG. 1, the linkage mechanism 10 is deformed against the elastic force of the spring 15 to laterally translate the chain guide 11 toward the seat tube 1, as shown by arrow p. As a result, the inner guide plate 11a of the chain guide 11 pushes the chain C out of engagement with the smaller sprocket Sb into engagement with the larger sprocket Sa, as shown in FIG. 2.

Conversely, when the shift lever is reversely operated to pay out the cable 13 in the direction of arrow Q, the linkage mechanism 10 restoratively deforms under the elastic force of the spring 15 while the degree of restoration is regulated by the amount of the cable pay-out. As a result, the chain guide 11 translates in the direction of arrow q, so that the chain C is pushed by the inner guide plate 11a out of engagement with the smaller sprocket Sa into engagement with the larger sprocket Sb again.

With the top normal type front derailleur according to the present invention, the parallelogrammic linkage mechanism 10 can be deformed against the return spring 15 by pulling up the actuating arm 21 which extends laterally toward the bicycle frame from the upper end 4a of the outer link 4. Therefore, the control cable 13 may extend along the seat tube 1 from above for direct connection to the actuating arm without greatly bending the cable. Thus, the cable is less likely subjected to a large friction and mud deposition.

Further, when the shift lever is provided on the top tube which is connected to the seat tube 1, the overall length of the control cable 13 may be rendered smaller than is possible when bending the cable at the bottom lug of the bicycle frame. Thus, the elastic elongation of the cable may be made minimum to improve the operational response of the front derailleur.

The present invention being thus described, it is obvious that the same may be varied in many ways. Such variations are not to be regarded as a departure from the spirit and scope of the invention, and all such modifications as would be obvious to those skilled in the art are intended to be included within the scope of the following claims.

I claim:

1. A bicycle front derailleur which is mounted to a seat tube of the bicycle frame at a position close above a multiple chainwheel, the chainwheel comprising diametrically different sprockets, the derailleur being operated to press a chain laterally of the bicycle at a portion of the chain moving into engagement with the chainwheel for shifting the chain from one sprocket to another of the chainwheel, the derailleur comprising:

a base member fixed to the seat tube;

an inner link having one end connected to the base member by a pin so that the inner link is pivotable laterally of the bicycle;

an outer link having one end connected to the base member by another pin so that the outer link is pivotable laterally of the bicycle; and a movable member to which the respective other ends of the inner and outer links are pivoted by further pins; wherein:

the respective pins are arranged at the respective corners of a parallelogram so that the base member, the inner link, the outer link and the movable member form a deformable parallelogrammic linkage mechanism which is always biased by a return spring in a direction to translate the movable member laterally away from the seat tube;

the movable member carries a chain guide which includes an inner guide plate and an outer guide plate, the inner and outer guide plates being opposed to each other on both sides of the chain; and the outer link is provided at said one end thereof with an actuating arm extending laterally toward the seat tube, the actuating arm having a free end connected to a control cable for pulling up the actuating arm.

2. A front derailleur as defined in claim 1, wherein the pin connecting said one end of the outer link to the base member is positioned above the pin connecting said one end of the inner link to the base member.

3. A front derailleur as defined in claim 1, wherein the free end of the actuating arm is located in near proximity of the seat tube.

4. A front derailleur as defined in claim 1, wherein the actuating arm extends slightly downwardly toward the seat tube when the linkage mechanism is deformably returned by the return spring to a normal position in which the movable member is located maximally away from the seat tube.

5. A front derailleur as defined in claim 1, wherein the return spring is in the form of a coil spring provided around the pin connecting the inner link to the movable member, the coil spring having one leg engaging the pin which connects the inner link to the base member, the coil spring further having another leg engaging the movable member, whereby the movable member is always biased laterally away from the seat tube.

6. A front derailleur as defined in claim 1, wherein the movable member and the chain guide are integrally formed by a single plate-like member.

* * * * *